US009576560B2

(12) United States Patent
Furch et al.

(10) Patent No.: US 9,576,560 B2
(45) Date of Patent: Feb. 21, 2017

(54) NECK FOR STRINGED INSTRUMENT

(71) Applicants: František Furch, Velké Němčice (CZ); Petr Furch, Velké Němčice (CZ)

(72) Inventors: František Furch, Velké Němčice (CZ); Petr Furch, Velké Němčice (CZ)

( * ) Notice: Subject to any disclaimer, the term of this patent is extended or adjusted under 35 U.S.C. 154(b) by 0 days.

(21) Appl. No.: 15/103,124

(22) PCT Filed: Dec. 3, 2014

(86) PCT No.: PCT/CZ2014/000145

§ 371 (c)(1),
(2) Date: Jun. 9, 2016

(87) PCT Pub. No.: WO2015/106731

PCT Pub. Date: Jul. 23, 2015

(65) Prior Publication Data

US 2016/0307546 A1 Oct. 20, 2016

(30) Foreign Application Priority Data

Jan. 15, 2014 (CS) ......................... PUV 2014-29086

(51) Int. Cl.
*G01D 3/06* (2006.01)
*G10D 3/06* (2006.01)
*G10D 1/08* (2006.01)

(52) U.S. Cl.
CPC . *G10D 3/06* (2013.01); *G10D 1/08* (2013.01)

(58) Field of Classification Search
CPC .................................... G10D 3/06; G10D 1/08
See application file for complete search history.

(56) References Cited

U.S. PATENT DOCUMENTS

| | | | | | |
|---|---|---|---|---|---|
| 447,947 | A * | 3/1891 | Durkee | G10D 3/06 | 84/293 |
| 463,953 | A * | 11/1891 | Middlebrooke | G10D 3/06 | 84/293 |
| 498,113 | A * | 5/1893 | Hartmann | G10D 3/06 | 84/293 |
| 1,707,192 | A | 3/1929 | Overton | | |
| 1,818,631 | A * | 8/1931 | Larson | G10D 3/06 | 84/293 |
| 2,087,631 | A * | 7/1937 | Simpson | G10D 1/08 | 84/293 |
| 2,497,116 | A | 2/1950 | Dopyera | | |
| 3,188,902 | A | 6/1965 | Levasseur | | |
| 4,638,708 | A * | 1/1987 | Kamal | G10D 3/06 | 84/293 |

(Continued)

FOREIGN PATENT DOCUMENTS

WO 00/74032 A1 12/2000

OTHER PUBLICATIONS

International Search Report of PCT/CZ2014/000145, mailed May 19, 2015.

*Primary Examiner* — Robert W Horn
(74) *Attorney, Agent, or Firm* — Collard & Roe, P.C.

(57) ABSTRACT

Stringed instrument, especially the guitar with flexible connection of the upper part of the heel of the neck below the fingerboard to the fixing block in the body of the instrument, whereby the lower free end of the heel of the neck is coupled to a fixing block in the body of a stringed instrument through the rod via a rectification element which dilates in reaction to atmospheric humidity changes.

7 Claims, 2 Drawing Sheets

(56) References Cited

U.S. PATENT DOCUMENTS

| | | | | |
|---|---|---|---|---|
| 4,930,389 | A * | 6/1990 | Kunstadt .................. | G10D 3/06 84/293 |
| 6,051,766 | A | 4/2000 | Taylor | |
| 6,897,366 | B2 * | 5/2005 | McPherson .............. | G10D 3/06 84/267 |
| 7,652,205 | B2 * | 1/2010 | Leach ...................... | G10D 1/08 84/267 |
| 8,183,446 | B1 * | 5/2012 | Ward ....................... | G10D 1/08 84/267 |
| 9,368,092 | B2 * | 6/2016 | Hooker .................... | G10D 3/06 |
| 2001/0010186 | A1 | 8/2001 | Steinberger | |
| 2016/0307546 | A1 * | 10/2016 | Furch ...................... | G10D 3/06 |

* cited by examiner

NECK FOR STRINGED INSTRUMENT

CROSS REFERENCE TO RELATED APPLICATIONS

This application is the National Stage of PCT/CZ2014/000145 filed on Dec. 3, 2014, which claims priority under 35 U.S.C §119 of Czech Application No. PUV 2014-209086 filed on Jan. 15, 2014, the disclosure of which is incorprated by reference. The international application under PCT article 21(2)Was published in English.

FIELD OF THE INVENTION

The present invention relates to stringed instrument, especially a guitar with a flexible connection of the upper neck heel below the fingerboard to the fixing block in the instrument body with an automatic rectification of the neck of the stringed instrument with regard to varying relative atmospheric humidity environment.

DESCRIPTION OF THE PRIOR ART

With stringed instrument, especially the guitar with relatively long neck, special attention has to be paid to this element regarding the manufacturing process and so is the case with the block within the guitar body for fixing the heel of said neck. However, these elements are relatively positionally dependent on the small but not inconsiderable deformations of the upper soundboard and its reinforcing ribs, especially in the area below the bridge, under the influence of variable atmospheric humidity, particularly when transporting the stringed instrument from one climate zone to another, but also during transport within one region, or with a short-term instrument transferring from outdoor to the indoor environment with different climatic conditions, etc.

Said deformations are manifested through a change of the inclination of the neck with the fingerboard with respect to the stringed field and then substantially in the fingerboard size, which is important for proper control of the instrument during the playing and for maintaining the tuning.

The vast majority of quality guitars is therefore equipped with various adjustment systems that consist for example of various existing manually operable screws connecting the heel of the neck with the fixing block in the body of the guitar, for example, as it is evident from the document US 2003/0145712 A1 or in combination with replaceable washers (U.S. Pat. No. 6,051,766), optionally in combination with self-locking wedge, as may be seen for example from the U.S. Pat. No. 1,707,192 and the like.

A common disadvantage of the above adjustment systems is that with variations of ambient atmospheric humidity, which eventually leads to a slight change in the longitudinal position of both the guitar neck and the fixing block, that are particularly due to deformation of the top of the soundboard in the area below the bridge and other strength parts of the guitar, it is still usually necessary to perform, via the adjusting system, manual setting of the guitar neck to adjust the fingerboard.

Nature of the Invention

The aim is to eliminate the mentioned disadvantages, to simplify both design and arrangement of the adjusting system or their complete removal, and to create a stringed instrument, particularly a guitar with an automatic neck rectification, preferably a guitar with a flexible connection of the upper heel part of the neck below the fingerboard to the fixing block in the instrument body, wherein this objective is achieved by the invention, whose principle consists in that the lower free end of the neck heel is coupled to the fastening block in the body of the stringed instrument by a rod through a rectification element that is able to compensate humidity dilatation.

Simplicity and accessibility of the invention is particularly evident due the fact that the rectifying element is made of wood.

To achieve the appropriate effect of the wooden rectification element it is of advantage, due to absorbency, that it has its longitudinal rings arranged transversely to the rod.

Existing variability appears to be advantageous for achieving possible variability of different ranges of the rectifying element performance that may be in the form of a cylindrical, conical or other similar spatial geometrical figure, with adaptation to the type of stringed instruments, and with their known deformation.

From the strength point of view it is advantageous, for example, that a reinforcing element for connection to the transversal strength rod is arranged in the neck heel.

For basic and additional tuning of the rectification of the neck of the stringed instrument is preferable to have the screw-shaped push rod having an enlarged head with handling recess on the side of the rectifying element.

According to the invention, it is advantageous that in order to prevent possible undesirable separation or to avert break up danger of the neck of the stringed instrument that the rod consists of a threaded connection of a bolt run-out with a threaded extension that is axially displaceable in the fixing block of the stringed instrument body while the amount of the displacement is limited.

DESCRIPTION OF THE DRAWINGS

Further advantages and effects of the present invention are apparent from the accompanying drawings, where.

EXAMPLES OF THE VERSIONS OF THE INVENTION

Figure 1:
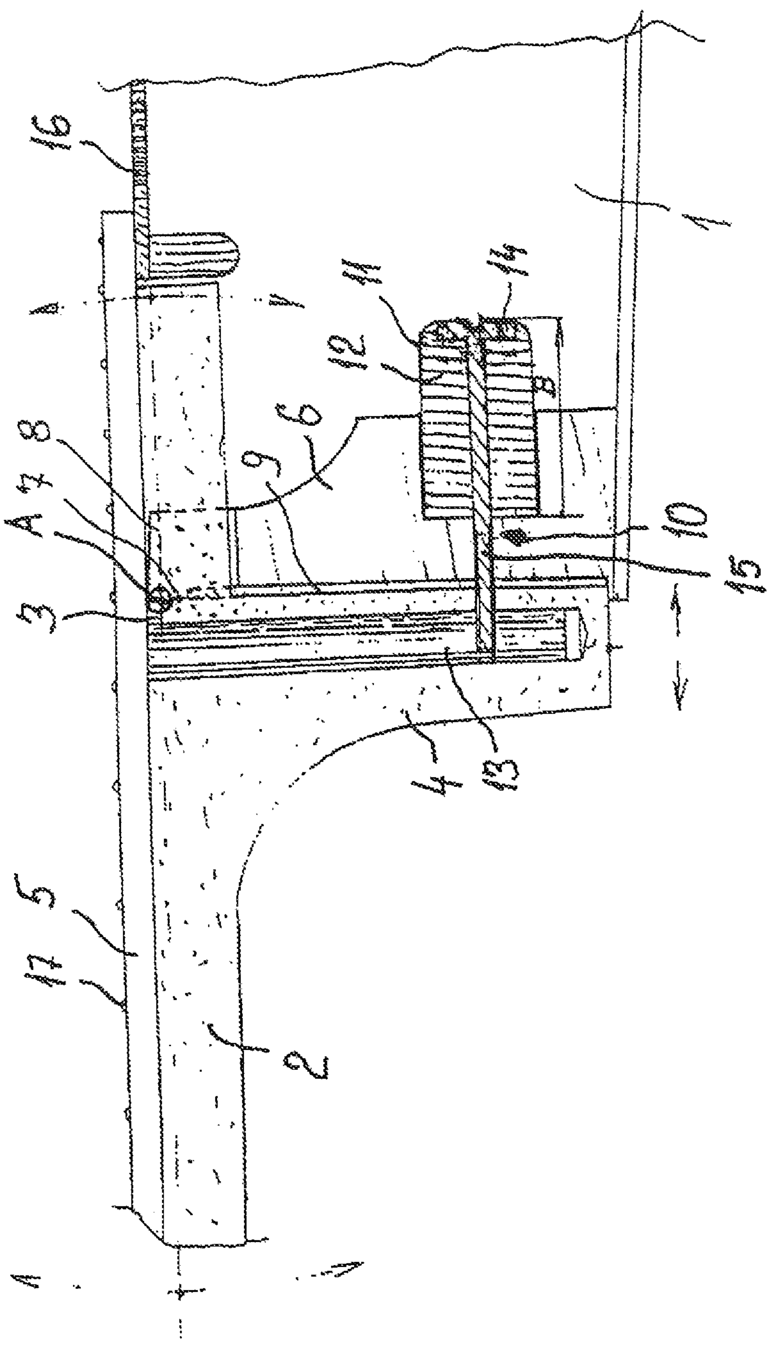
FIG. 1 Longitudinal sectional view of a variant configuration of the flexible connection of the upper neck part of the stringed instrument to the fixing block in the stringed instrument body, showing the connection of the lower free end of the neck heel with the fixing block through the rod via a rectification element, which reacts with atmospheric humidity that is the cause of dilatation.

The stringed instrument L particularly a guitar with automatic rectification of the neck 2 characterized in that the exemplary embodiment outlined in FIG. 1 is provided with flexible connection of the upper part 3 of the heel 4 of the neck 2 below the fingerboard said upper part 3 being fitted to the fixing block 6 in the instrument body 1, for example through a supporting transversal line A using a transversal pin, not shown here, or by simple leaning against the projections 7 on the fork 8 of the fixing block 6 by applying strips of a flexible adhesive or tape, etc., so that to obtain the dilatation gap 9 between the front of the fixing block 6 and the heel 4 of the neck 2.

The lower free end of the heel 4 of the neck 2 is coupled to the fixing block 6 in the body of the stringed instrument 1 through the rod 10 through the rectification element 11 with atmospheric humidity that is the cause of dilatation, and said element 11 is according to the embodiment made of wood.

To achieve the appropriate effect of the wooden rectification element 11 it is of advantage, due to absorbency, that it has its longitudinal rings 12 arranged transversely to the rod 10.

To obtain various performance ranges of the wooden rectification element 11 it can be created in the form of cylindrical, conical or other similar spatial geometrical figure, with adaptation to the types of stringed instruments 1 and to their known deformation factors in considering the type of wood from which it is made.

From the point of view of strength it is advantageous that the heel 4 of the neck 2 is provided with the reinforcing element 13, for example in the form of a cylindrical shaft made of light alloy or tough wood etc., for rigid cross connection with the rod 10.

For basic and additional tuning of the rectification neck 2 of the stringed instrument 1 it is advantageous that the rod 10 is made for example in the form of a screw 15 that is provided on the side of the rectifying element 11 with an enlarged cylindrical head 14 with a handling recess, which may be accessed through a not depicted hole in the top plate 16 of a stringed instrument 1.

Swelling or shrinkage of the dimension B of the rectifying element 11 resulting from changes in ambient relative humidity and consecutive movement action of the rod 10 on the lower end of the heel 4 cause automatic variations in inclination of the end of the heel 4 together with the neck 2 as indicated by arrows in the figure, induce systematic maintaining of an appropriate fretboard, or distance of the stringfield, here not shown, from frets 17 on the fingerboard 5 of the neck 2.

Figure 2:
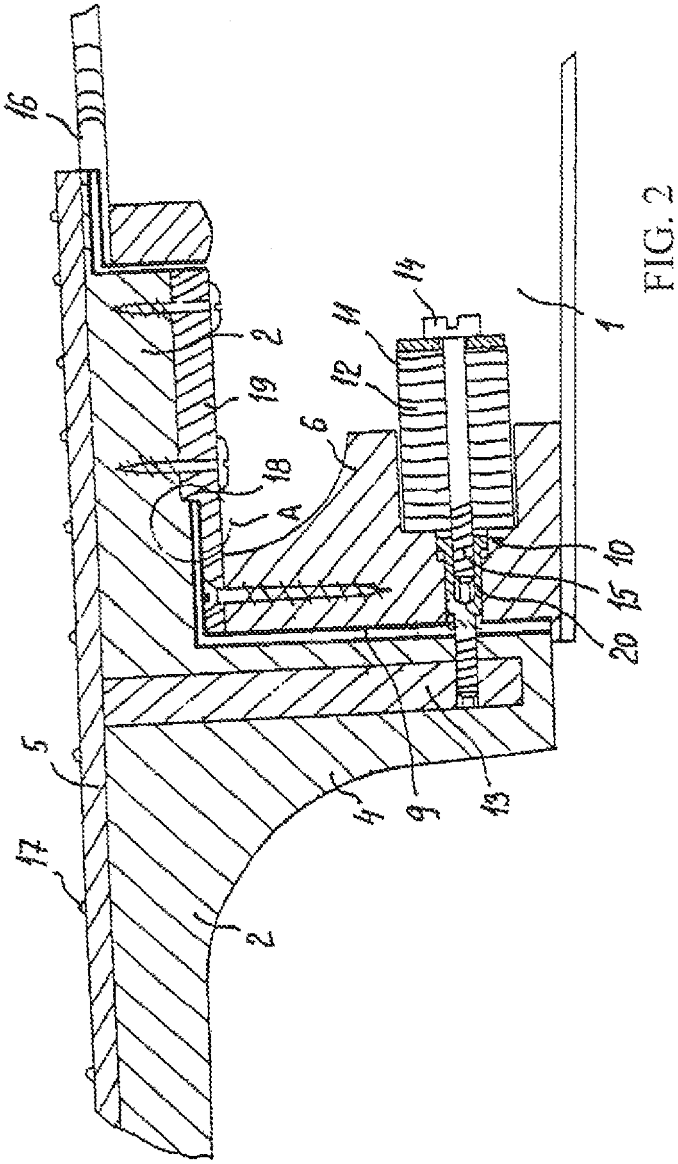
FIG. 2 Longitudinal section of the flexible connection of the upper neck part of the stringed instrument to the fixing block in the body of the stringed instrument by means of at least partly flexible plate, showing a variant embodiment of the rectification rod element.

Variable arrangement of the rectification of the neck 2 as shown in FIG. 2 applicable for various types of stringed instruments 1 may lie in the fact that the supporting transversal line A is transferred to the elastic head plate 19 that is partly flexible in the longitudinal direction and provided with the transversal shoulder 18, which is firmly attached to both the upper end of the shortened fixing block 6 as well as to the underside of the extended part of the neck 2. In adapting height, position, or other modification of the shoulder 18 on the elastic head plate A it is possible to create the structure of the neck 2 with the body of the fixing block 6, where at least between the face of this fixing block 6 and the heel 4 of the neck 2 arises an expansion space 9 for activities of the rectifying element 11.

The same figure indicates an adaptation of the rod 10 whereby said rod consists of a threaded run-out of the screw 15 with a threaded extension 20 while the amount of the displacement in the fixing block 6 in the body of a stringed instrument 1 is limited. The threaded extension 20 is bolted together with a reinforcing element 13. This arrangement of the rod 10 prevents the danger of separating of the neck 2 after an uncontrollable removal of all strings from the body of the stringed instrument 1 or that it did not happen during a possible exchange of the rectifying element 11 and the like.

The invention claimed is:

1. Stringed instrument (1), with flexible connection of the upper part (3) of the heel (4) of the neck (2) below the fingerboard (5) to the fixing block (6) in the body of the instrument (1), wherein the lower free end of the heel (4) of the neck (2) is coupled to the fixing block (6) in the body of the stringed instrument (1) through a rod (10) via a rectification element (11), which reacts with atmospheric humidity that is the cause of dilatation.

2. Stringed instrument (1) according to the claim 1, wherein the rectification element (11) is made of wood.

3. Stringed instrument (1) according to the claim 1, wherein the body of the wooden rectification element (11) has its longitudinal rings (12) arranged transversely to the rod (10).

4. Stringed instrument (1) according to the claim 1, wherein the body of the wooden rectification element (11) is in the form of a cylindrical, conical or other similar spatial geometrical figure.

5. Stringed instrument (1) according to the claim 1, wherein the heel (4) of the neck (2) provided with a reinforcing element (13) for a rigid cross connection with the rod (10).

6. Stringed instrument (1) according to the claim 1, wherein the rod (10) comprises the screw (15) that is provided on the side of the rectifying element (11) with an enlarged head (14) with a handling recess.

7. Stringed instrument (1) according to the claim 1, wherein the rod (10) comprises a threaded run-out of the screw (15) with a threaded extension (20), while the amount of the displacement in the fixing block (6) in the body at a stringed-instrument (1) is limited.

* * * * *